United States Patent
Kanamaru et al.

(10) Patent No.: US 7,420,023 B2
(45) Date of Patent: Sep. 2, 2008

(54) PROCESS FOR PRODUCING MODIFIED BUTENE-1 POLYMER AND MODIFIED BUTENE-1 POLYMER OBTAINED BY THE PROCESS

(75) Inventors: Masami Kanamaru, Chiba (JP); Yutaka Minami, Chiba (JP); Ryo Aburatani, Chiba (JP); Tomio Tatsumi, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 446 days.

(21) Appl. No.: 10/504,141

(22) PCT Filed: Feb. 19, 2003

(86) PCT No.: PCT/JP03/01792

§ 371 (c)(1),
(2), (4) Date: Jun. 20, 2005

(87) PCT Pub. No.: WO03/070786

PCT Pub. Date: Aug. 28, 2003

(65) Prior Publication Data

US 2005/0245710 A1    Nov. 3, 2005

(30) Foreign Application Priority Data

Feb. 20, 2002    (JP)    ............................. 2002-043543

(51) Int. Cl.
*C08F 10/08*    (2006.01)
(52) U.S. Cl. ...................... 526/348.6; 526/160; 526/943
(58) Field of Classification Search ............. 526/348.6, 526/160, 943, 352.2
See application file for complete search history.

(56) References Cited

U.S. PATENT DOCUMENTS 6,221,967 B1    4/2001    Rodriguez et al.

2003/0069320 A1    4/2003    Minami et al.
2004/0096682 A1    5/2004    Kanamaru et al.
2004/0204552 A1    10/2004    Minami et al.
2005/0245710 A1    11/2005    Kanamaru et al.

FOREIGN PATENT DOCUMENTS

| GB | 2 022 597 A | * 12/1979 |
|---|---|---|
| JP | 59-206415 | 11/1984 |
| JP | 61-9477 | 1/1986 |
| JP | 62-119213 | 5/1987 |
| JP | 8-225605 | 9/1996 |

OTHER PUBLICATIONS

U.S. Appl. No. 11/858,952, filed Sep. 21, 2007, Minami et al.

* cited by examiner

*Primary Examiner*—Ling-Siu Choi
(74) *Attorney, Agent, or Firm*—Oblon, Spivak, McClelland, Maier & Neustadt, P.C.

(57) ABSTRACT

The present invention relates to a process for producing a buten-1-based polymer satisfying the following requirements (a), (b) and (c): (a) a crystalline resin having a melting point (Tm-D) of 0 to 100° C., the melting point being defined as a top of a peak observed on a highest-temperature side in a melting endothermic curve obtained by a differential scanning calorimeter (DSC) when a sample is held in a nitrogen atmosphere at −10° C. for 5 min and then heated at a temperature rise rate of 10° C./min; (b) a stereoregularity index represented by (mmmm)/(mmrr+rmmr) of 20 or less; and (c) a weight-average molecular weight (Mw) of 10,000 to 1,000,000 and a ratio (Mw/Mn) of weight-average molecular weight to number-average molecular weight of 4.0 or less; a modified buten-1-based polymer produced by modifying the buten-1-based polymer with a radical polymerization initiator and an organic acid; and an adhesive composition containing the modified buten-1-based polymer. The modified buten-1-based polymer of the present invention is capable of imparting a high adhesiveness, a high strength and a good softness to polyolefins, and providing sealants having a high adhesiveness, or polyolefins having an improved compatibility to inorganic fillers, etc., in particular, is useful as resins for hot-melt adhesives.

14 Claims, No Drawings

PROCESS FOR PRODUCING MODIFIED BUTENE-1 POLYMER AND MODIFIED BUTENE-1 POLYMER OBTAINED BY THE PROCESS

TECHNICAL FIELD

The present invention relates to a process for producing a modified buten-1-based polymer, a modified buten-1-based polymer produced by the process, and an adhesive composition containing the modified buten-1-based polymer.

More particularly, the invention relates to a process for efficiently producing a modified buten-1-based polymer that is useful as a high-adhesive sealant or a modifier for polyolefins, for example, a modifier for obtaining polyolefins having an enhanced compatibility to inorganic fillers, a modified buten-1-based polymer produced by the process, and an adhesive composition containing the modified buten-1-based polymer.

BACKGROUND ART

Hitherto, olefin-based polymers obtained by graft-modifying a polyolefin such as polyethylene and polypropylene with an unsaturated carboxylic acid or an acid anhydride thereof have been used as modifiers for various resins or tackifiers.

Meanwhile, it has been expected that a blend of low-stereoregular polybuten-1 produced in the presence of metallocene-based catalysts with polypropylene produced in the presence of magnesium-titanium-based catalysts, is usable to control an elastic modulus of the polymer, or form a heat-seal layer in multilayer films, etc. However, the polybuten-1 has been further required to show much higher strength and adhesiveness.

Under these circumstances, an object of the present invention is to provide a modifier that is useful for imparting a high adhesiveness, a high strength and a good softness to polyolefins, and for obtaining sealants having a high adhesiveness, or polyolefins having an improved compatibility to inorganic fillers, etc., as well as an adhesive composition containing the modifier.

DISCLOSURE OF THE INVENTION

As a result of extensive researches for developing modifiers having the above excellent functions, the inventors have found that the above object can be achieved by modifying low-stereoregular buten-1-based polymers having specific properties with a radical polymerization initiator and an organic acid.

The present invention has been accomplished on the basis of the above finding.

Thus, the present invention provides:

(1) a process for producing a modified buten-1-based polymer comprising the step of modifying a buten-1-based polymer satisfying the following requirements (a), (b) and (c):

(a) a crystalline resin having a melting point (Tm-D) of 0 to 100° C., the melting point being defined as a top of a peak observed on a highest-temperature side in a melting endothermic curve obtained by a differential scanning calorimeter (DSC) when a sample is held in a nitrogen atmosphere at −10° C. for 5 min and then heated at a temperature rise rate of 10° C./min;

(b) a stereoregularity index represented by [mmmm]/([mmrr]+[rmmr]) of 20 or less; and (c) a weight-average molecular weight (Mw) of 10,000 to 1,000,000 and a ratio (Mw/Mn) of weight-average molecular weight to number-average molecular weight of 4.0 or less, with a radical polymerization initiator and an organic acid;

(2) the process according to the above aspect (1), wherein the fraction [mmmm] (%) in said buten-1-based polymer satisfies the following formulae:

$20 \leq [mmmm] \leq 90$, and $[mmmm] \leq 90 - 2 \times [rr]$;

(3) the process according to the above aspect (1) or (2), wherein said buten-1-based polymer is a buten-1 homopolymer or a copolymer of buten-1 containing buten-1 units in an amount of 90 mol % or more, with a $C_2$ to $C_{20}$ α-olefin except for buten-1;

(4) the process according to the above aspect (1), wherein said buten-1-based polymer has a II-type crystal fraction (CII) of 50% or less as measured by X-ray diffraction analysis after the polymer to be analyzed is melted at 190° C. for 5 min, rapidly cooled and solidified with ice water, and then allowed to stand at room temperature for 1 h;

(5) the process according to the above aspect (1), wherein the modification of said buten-1-based polymer is performed in an organic solvent;

(6) the process according to the above aspect (1), wherein the modification of said buten-1-based polymer is performed in a molten state;

(7) the process according to the above aspect (1), wherein the radical polymerization initiator is an organic peroxide, and the organic acid is a compound selected from the group consisting of maleic anhydride, acrylic acid and acrylic acid esters;

(8) the process according to the above aspect (1), wherein the modification of said buten-1-based polymer is performed under the coexistence of a styrene-based compound;

(9) a modified buten-1-based polymer produced by the process as described in the above aspect (1);

(10) the modified buten-1-based polymer according to the above aspect (9), wherein said polymer has a weight-average molecular weight (Mw) of 10,000 to 600,000;

(11) an adhesive composition containing the modified buten-1-based polymer as described in the above aspect (9); and

(12) the adhesive composition according to the above aspect (11), wherein 100 parts by mass of the buten-1-based polymer is modified with 0.1 to 50 parts by mass of the organic acid selected from the group consisting of maleic anhydride, acrylic acid and acrylic acid esters.

BEST MODE FOR CARRYING OUT THE INVENTION

The present invention will be described in detail below.

In the process for producing the modified buten-1-based polymer according to the present invention, a buten-1-based polymer is used as a raw polymer to be modified.

The raw buten-1-based polymer is preferably a buten-1 homopolymer or a copolymer of buten-1 containing buten-1 units in an amount of 90 mol % or more, with a $C_2$ to $C_{20}$ α-olefin except for buten-1.

The copolymer is preferably in the form of a random copolymer.

Examples of the $C_2$ to $C_{20}$ α-olefin except for buten-1 include ethylene, propylene, penten-1,4-methylpenten-1, hexen-1, octen-1, decen-1, dodecen-1, tetradecen-1, hexadecen-1, octadecen-1 and 1-eicosen-1. In the present invention, these α-olefins may be used alone or in the form of a mixture of any two or more thereof.

The content of the buten-1 units in the above copolymer is preferably 95 mol % or more.

Meanwhile, the method of measuring the content of the buten-1 units is explained later.

Also, the buten-1-based polymer used in the present invention includes the buten-1 homopolymer or the above copolymer unless otherwise specified.

The buten-1-based polymer used in the present invention has the following properties.

First, the buten-1-based polymer is a crystalline resin having a melting point (Tm-D) of 0 to 100° C. and preferably 0 to 80° C. as measured by a differential scanning calorimeter (DSC), in view of a good softness thereof.

Meanwhile, the melting point (Tm-D) is determined by the following DSC measurement.

That is, the melting point (Tm-D) is defined as a top of a peak observed on a highest-temperature side in a melting endothermic curve obtained by a differential scanning calorimeter (DSC) when a sample is held in a nitrogen atmosphere at −10° C. for 5 min and then heated at a temperature rise rate of 10° C./min.

Then, the buten-1-based polymer has such a low stereoregularity that a stereoregularity index thereof represented by [mmmm]/([mmrr]+[rmmr]) is 20 or less.

The mesopentad fractions [mmmm], [mmrr] and [rmmr] are values determined according to the method proposed in "Polymer Journal", Vol. 16, p. 717(1984), "Macromol. Chem. Phys.", C29, p. 201(1989), and "Macromol. Chem. Phys.", Vol. 198, p. 1257(1997).

More specifically, the mesopentad fractions [mmmm], [mmrr] and [rmmr] in a molecule of the buten-1-based polymer are determined by measuring signals attributed to methylene and methine groups from isotopic carbon nuclear magnetic resonance ($^{13}C$-NMR) spectrum using the following apparatus under the following conditions. From thus measured mesopentad fractions, the stereoregularity index was calculated according to the above formula.

In addition, the racemic triad fraction [rr] is also determined by the above method.

<Apparatus and Conditions Used in $^{13}C$-NMR Spectrum Measurement>

Apparatus: $^{13}C$-NMR measuring apparatus "JNM-EX400 Model" available from Nippon Denshi Co., Ltd.;
Method: proton complete decoupling method;
Sample concentration: 230 mg/mL;
Solvent: mixed solvent of 1,2,4-trichlorobenzene and heavy benzene (volume ratio: 90:10);
Measuring temperature: 130° C.;
Pulse width: 450;
Pulse repetition period: 4 s; and
Cumulative frequency: 10,000 times Meanwhile, in the case where the buten-1-based polymer is in the form of a copolymer of buten-1 containing buten-1 units in an amount of 90 mol % or more, with a $C_2$ to $C_{20}$ α-olefin except for buten-1, the mesopentad fractions [mmmm], [mmrr] and [rmmr] contained in the buten-1 chain may be measured.

If the stereoregularity index exceeds 20, it is not possible to obtain the modified buten-1-based polymer having desired properties.

The stereoregularity index of the buten-1-based polymer is preferably 18 or less and more preferably 15 or less.

Also, in view of properties of the obtained modified buten-1-based polymer, the mesopentad fraction [mmmm] in the buten-1-based polymer is preferably 20 to 90%, more preferably 30 to 85% and still more preferably 30 to 80%, and simultaneously satisfies preferably (90−2×[rr])% or less and more preferably (87−2×[rr])% or less.

In addition, the buten-1-based polymer has a weight-average molecular weight (Mw) of 10,000 to 1,000,000.

If the weight-average molecular weight (Mw) of the buten-1-based polymer is out of the above-specified range, it is not possible to obtain the modified buten-1-based polymer having desired properties.

The weight-average molecular weight (Mw) of the buten-1-based polymer is preferably in the range of 100,000 to 1,000,000 and more preferably 100,000 to 600,000.

Further, the ratio (Mw/Mn) of weight-average molecular weight to number-average molecular weight of the buten-1-based polymer as an index of a molecular weight distribution thereof is 4.0 or less.

If the ratio (Mw/Mn) exceeds 4.0, it is not possible to obtain the modified buten-1-based polymer having desired properties.

The ratio (Mw/Mn) is preferably 3.5 or less and more preferably 3.0 or less.

Meanwhile, the weight-average molecular weight (Mw) and number-average molecular weight (Mn) are measured in terms of polystyrene by gel permeation chromatography (GPC) using the following apparatus and conditions.

<Apparatus and Conditions Used in GPC Measurement>

GPC measuring apparatus
Column: TOSO GMHHR-H(S)HT
Detector: RI Detector "WATERS 150C" for liquid chromatogram
Measuring conditions:
Solvent: 1,2,4-trichlorobenzene;
Measuring temperature: 145° C.;
Flow rate: 1.0 mL/min;
Sample concentration: 2.2 mg/mL;
Amount charged: 150 µL;
Calibration curve: Universal Calibration; and
Analytic program: HT-GPC (Ver. 1.0)

Also, the buten-1-based polymer used in the present invention preferably has a II-type crystal fraction (CII) of 50% or less, more preferably 20% or less and mot preferably 0%, as measured by X-ray diffraction analysis after the polymer to be analyzed is melted at 190° C. for 5 min, rapidly cooled and solidified with ice water, and then allowed to stand at room temperature for 1 h.

Meanwhile, the II-type crystal fraction (CII) is determined according to the method proposed in "Polymer", Vol. 7, p. 23(1966).

More specifically, the buten-1-based polymer is subjected to X-ray diffraction analysis to measure peaks of 1-type crystal state and II-type crystal state thereof, and the II-type crystal fraction (CII) in the crystal of the buten-1-based polymer is calculated from the measured values.

The above X-ray diffraction analysis (WAXD) is performed using an anticathode-type apparatus "Rotor Flex RU-200" available from Rigaku Denki Co., Ltd., under the following conditions.

Sample condition: Melted at 190° C. for 5 min, rapidly cooled and solidified with ice water, and then allowed to stand at room temperature for 1 h;
Output power: 30 kV, 200 mA;
Detector: PSPC (position sensitive proportional counter)
Cumulative time: 200 s Next, in the case where the buten-1-based polymer used in the present invention is an ethylene-buten-1 copolymer, the content of the buten-1 units and the above stereoregularity index are measured as follows.

Specifically, the content of the buten-1 units is calculated from $^{13}$C-NMR spectrum measured using an NMR measuring apparatus "JNM-EX400 Model" available from Nippon Denshi Co., Ltd., under the following conditions.

Sample concentration: 220 mg/3 mL of NMR solution;
NMR solution: 1,2,4-trichlorobenzene/benzene-d6 (90/10 vol %);
Measuring temperature: 130° C.;
Pulse width: 45°;
Pulse repetition period: 10 s; and
Cumulative frequency: 4,000 times.

Under the above conditions, signals attributed to $S\alpha\alpha$ carbon in $^{13}$C-NMR spectrum for EE, EB and BB chains are measured by the method proposed in "Macromolecules", Vol. 15, pp. 353-360(1982) to determine EB and BB diad chain fractions in the molecular chain of the copolymer.

From the thus obtained respective diad chain fractions, the content of the buten-1 units is calculated according to the following formula:

Content of Buten–1 Units (mol %)=$[BB]+[EB]/2$ wherein [BB] represents a buten-1 chain fraction; and [EB] represents a ethylene-buten-1 chain fraction.

Also, the stereoregularity index of the buten-1-based polymer is measured by the above method. In particular, in the case where the buten-1-based polymer is an ethylene-buten-1 copolymer, the peak attributed to (rmmr+mmrr) is overlapped with that of side-chain methylene carbon derived from BEE chain. Therefore, the peak intensity of (rmmr+mmrr) is corrected by subtracting the value of a component of $T\alpha\delta$ carbon peak at 37.5 to 37.2 from the overlapped intensity of the peak of (rmmr+mmrr) and that of the side-chain methylene carbon derived from the BEE chain.

When the buten-1-based polymer is in the form of a propylene-buten-1 copolymer, the content of the buten-1 units is determined as follows.

Specifically, the content of the buten-1 units is calculated from $^{13}$C-NMR spectrum measured using an NMR measuring apparatus "JNM-EX400 Model" available from Nippon Denshi Co., Ltd., under the following conditions.

Sample concentration: 220 mg/3 mL of NMR solution;
NMR solution: 1,2,4-trichlorobenzene/benzene-d6 (90/10 vol %);
Measuring temperature: 130° C.;
Pulse width: 45°;
Pulse repetition period: 10 s; and
Cumulative frequency: 4,000 times.

Under the above conditions, signals attributed to $S\alpha\alpha$ carbon in $^{13}$C-NMR spectrum for PB and BB chains are measured by the method proposed in "Macromolecules", Vol. 11, p. 592(1978) to determine PB and BB diad chain fractions in the molecular chain of the copolymer.

From the thus obtained respective diad chain fractions (mol %), the content of the buten-1 units is calculated according to the following formula:

Content of Buten–1 Units (mol %)=$[BB]+[PB]/2$ wherein [BB] represents a buten-1 chain fraction; and [PB] represents a propylene-buten-1 chain fraction.

When the buten-1-based polymer is in the form of an octen-1-buten-1 copolymer, the content of the buten-1 units is determined as follows.

Specifically, the content of the buten-1 units is calculated from $^{13}$C-NMR spectrum measured using an NMR measuring apparatus "JNM-EX400 Model" available from Nippon Denshi Co., Ltd., under the following conditions.

Sample concentration: 220 mg/3 mL of NMR solution;
NMR solution: 1,2,4-trichlorobenzene/benzene-d6 (90/10 vol %);
Measuring temperature: 130° C.;
Pulse width: 450;
Pulse repetition period: 10 s; and
Cumulative frequency: 4,000 times.

Under the above conditions, signals attributed to $S\alpha\alpha$ carbon in $^{13}$C-NMR spectrum are measured to obtain BB and OB diad chain fractions in the molecular chain of the copolymer from the peak intensity values derived from BB chain observed at 40.8 to 40.0 ppm and OB chain observed at 41.3 to 40.8 ppm.

From the thus obtained respective diad chain fractions (mol %), the content of the buten-1 units is calculated according to the following formula:

Content of Buten –1 Units (mol %)=$[BB]+[OB]/2$ wherein [BB] represents a buten-1 chain fraction; and [OB] represents an octen-1-buten-1 chain fraction.

The process for producing the buten-1-based polymer having such properties is explained in detail later.

In the process for producing the modified buten-1-based polymer according to the present invention, the above buten-1-based polymer is modified with a radical polymerization initiator and an organic acid.

As the organic acid for modifying the buten-1-based polymer, there may be used unsaturated carboxylic acids or derivatives thereof.

Examples of the unsaturated carboxylic acids include acrylic acid, methacrylic acid, maleic acid, fumaric acid, itaconic acid, crotonic acid, citraconic acid, sorbic acid, mesaconic acid and angelic acid.

Also, as the derivatives of the unsaturated carboxylic acids, there may be used anhydrides, esters, amides, imides, metal salts, etc., of the unsaturated carboxylic acids. Examples of the derivatives include maleic anhydride, itaconic anhydride, citraconic anhydride, methyl acrylate, methyl methacrylate, ethyl acrylate, butyl acrylate, 2-ethylhexyl acrylate, maleic acid monoethyl ester, acrylamide, maleic monoamide, maleimide, N-butyl maleimide, sodium acrylate and sodium methacrylate.

Of these unsaturated carboxylic acids and derivatives thereof, preferred are maleic anhydride and acrylic acid.

These unsaturated carboxylic acids and derivatives thereof may be used singly or in the combination of any two or more thereof.

The radical polymerization initiator used in the present invention is not particularly limited, and may be appropriately selected from conventionally known radical polymerization initiators, for example, various organic peroxides, and azo-based compounds such as azobisisobutyronitrile and azobisisovaleronitrile. Of these radical polymerization initiators, preferred are organic peroxides.

Examples of the organic peroxides include diacyl peroxides such as dibenzoyl peroxide, di-3,5,5-trimethylhexanoyl peroxide, dilauroyl peroxide, didecanoyl peroxide and di(2,4-dichlorobenzoyl)peroxide; hydroperoxides such as t-butyl hydroperoxide, cumene hydroperoxide, diisopropylbenzene hydroperoxide and 2,5-dimethylhexane-2,5-dihydroperoxide; dialkyl peroxides such as di-t-butyl peroxide, dicumyl peroxide, 2,5-dimethyl-2,5-di(t-butylperoxy)hexane, 2,5- dimethyl-2,5-di(t-butylperoxy)hexyn-3 and α,α'-bis(t-butylperoxy)diisopropylbenzene; peroxyketals such as 1,1-bis-t-butylperoxy-3,3,5-trimethylcyclohexane and 2,2-bis(t-butylperoxy)butane; alkyl peroxyesters such as t-butyl peroxyoctoate, t-butyl peroxypivalate, t-butyl peroxyneodecanoate and t-butyl peroxybenzoate; and peroxycarbonates such as di-2-ethylhexyl peroxydicarbonate, diisopropyl peroxydicarbonate, di-sec-butyl peroxydicarbonate and t-butyl peroxyisopropylcarbonate.

Of these organic peroxides, preferred are dialkyl peroxides.

These organic peroxides may be used singly or in the combination of any two or more thereof.

The amounts of the above organic acid and radical polymerization initiator used are not particularly limited, and may be determined according to desired properties of the aimed modified buten-1-based polymer. Specifically, the organic acid is used in an amount of usually 0.1 to 50 parts by weight and preferably 0.1 to 30 parts by weight based on 100 parts by weight of the buten-1-based polymer to be modified, and the radical polymerization initiator is used in an amount of usually 0.01 to 10 parts by weight and preferably 0.01 to 5 parts by weight based on 100 parts by weight of the buten-1-based polymer to be modified.

The modification method used in the present invention is not particularly limited, and includes, for example, the method of melt-kneading the buten-1-based polymer with the organic acid and the radical polymerization initiator at a temperature of about 150 to 300° C. using a roll mill, a Banbury mixer or an extruder to react with each other, or the method of reacting the above components with each other in a suitable organic solvent, e.g., a hydrocarbon-based solvent such as butane, pentane, hexane, cyclohexane and toluene, a halogenated hydrocarbon-based solvent such as chlorobenzene, dichlorobenzene and trichlorobenzene, or liquefied α-olefins, at a temperature of about −50 to 300° C.

Also, in the present invention, the modification treatment may be conducted in the presence of a styrene-based compound.

Examples of the styrene-based compound include styrene; alkyl styrenes such as α-methyl styrene, p-methyl styrene, p-ethyl styrene, p-propyl styrene, p-isopropyl styrene, p-butyl styrene, p-tert-butyl styrene, p-phenyl styrene, o-methyl styrene, o-ethyl styrene, o-propyl styrene, o-isopropyl styrene, m-methyl styrene, m-ethyl styrene, m-isopropyl styrene, m-butyl styrene, mesityl styrene, 2,4-dimethyl styrene, 2,5-dimethyl styrene and 3,5-dimethyl styrene; alkoxystyrenes such as p-methoxystyrene, o-methoxystyrene and m-methoxystyrene; halogenated styrenes such as p-chlorostyrene, m-chlorostyrene, o-bromostyrene, p-fluorostyrene, m-fluorostyrene, o-fluorostyrene and o-methyl-p-fluorostyrene; and further trimethylsilyl styrene, vinylbenzoic acid esters and divinyl benzene.

These styrene-based compounds may be used singly or in the combination of any two or more thereof.

The styrene-based compound is used in an amount of usually 0.1 to 10 parts by weight and preferably 0.1 to 5 parts by weight based on 100 parts by weight of the buten-1-based polymer.

The use of the styrene-based compound enables a more efficient modification treatment.

Thus, the present invention provides the modified buten-1-based polymer.

The thus obtained modified buten-1-based polymer is capable of imparting a high adhesiveness, a high strength and a good softness to polyolefins, etc., and is useful as sealants having a high adhesiveness or modifiers for producing polyolefins having an improved compatibility to inorganic fillers, etc.

The acid-modified amount of the polymer is in the range of 0.01 to 50% by weight, preferably 0.1 to 40% by weight and more preferably 0.2 to 30% by weight.

If the acid-modified amount exceeds 50% by weight, the buten-1-based polymer tends to be considerably deteriorated in its quality. If the acid-modified amount is less than 0.01% by weight, the obtained polymer tends to be insufficient in adhesion strength, dispersibility of additives such as fillers therein, and coatability which are required as properties of the modified buten-1-based polymer.

In addition, the present invention also provides a adhesive composition containing the modified buten-1-based polymer.

That is, the modified buten-1-based polymer of the present invention may be blended with a suitable component to prepare a hot-melt adhesive composition.

As the component blended with the modified buten-1-based polymer, there may be used tackifier resins. Examples of the tackifier resins include rosin resins prepared from raw turpentine, terpene resins prepared from raw materials such as α-pinene and β-pinene obtained from pine essential oils, petroleum resins obtained by polymerizing unsaturated hydrocarbon-containing fractions by-produced upon thermal cracking of petroleum naphtha, and hydrogenated products thereof.

Examples of the commercially available tackifier resins include "I-MARB P-125", "I-MARB P-100" and "I-MARB P-90" all available from Idemitsu Petrochemical Co., Ltd., "U-MEX 1001" available from Sanyo Kasei Kogyo Co., Ltd., "HILET T1115" available from Mitsui Chemical Inc., "CLEARONE K100" available from Yasuhara Chemical Co., Ltd., "ECR227" and "ESCOLET 2101" both available from Tonex Co., Ltd., "ARCON P100" available from Arakawa Chemical Co., Ltd., and "Regalrez 1078" available from Hercules Inc.

In the present invention, as the tackifier resins, there are preferably used the hydrogenated products in view of compatibility with the base polymer.

In particular, of these tackifier resins, preferred are petroleum resins having an excellent thermal stability.

In the present invention, various additives such as plasticizers, inorganic fillers and antioxidants may be blended in the modified buten-1-based polymer, if required.

Examples of the plasticizers include paraffin-based process oils, polyolefin-based waxes, phthalic acid esters, adipic acid esters, aliphatic acid esters, glycols, epoxy-based high-molecular plasticizers and naphthene-based oils. Examples of the inorganic fillers include clay, talc, calcium carbonate and barium carbonate. Examples of the antioxidants include phosphorus-based antioxidants such as tris-nonylphenyl phosphite, distearylpentaerythritol diphosphite, "ADEKASTAB 1178" available from Asahi Denka Co., Ltd., "SUMIRISER TNP" available from Sumitomo Chemical Co., Ltd., "IRGAPHOS 168" available from Ciba Specialty Chemicals Corp., and "Sandtab P-EPQ" available from Sand Co., Ltd.; phenol-based antioxidants such as 2,6-di-t-butyl-4-methyl phenol, n-octadecyl-3-(3',5'-di-t-butyl-4'-hydroxyphenyl)propionate, "SUMIRISER BHT" available from Sumitomo Chemical Co., Ltd., and "IRGANOX 1010" available from Ciba Specialty Chemicals Corp.; and sulfur-based anti-oxidants such as dilauryl-3,3'-thiodipropionate, pentaerythritol tetrakis(3-laurylthiopropionate), "SUMIRISER TPL" available from Sumitomo Chemical Co., Ltd., "YOSHINOX DLTP" available from Yoshitomi Seiyaku Co., Ltd., and "ANTIOX L" available from Nihon Yushi Co., Ltd.

The hot-melt adhesive composition of the present invention is composed of 20 to 99% by mass of the above modified buten-1-based polymer and 80 to 1% by mass of the tackifier resin.

Preferably, the hot-melt adhesive composition of the present invention is composed of 25 to 95% by mass of the above modified buten-1-based polymer and 75 to 5% by mass of the tackifier resin.

More preferably, the hot-melt adhesive composition is composed of 30 to 85% by mass of the above modified buten-1-based polymer and 70 to 15% by mass of the tackifier resin. Most preferably, the hot-melt adhesive composition is composed of 35 to 75% by mass of the above modified buten-1-based polymer and 65 to 25% by mass of the tackifier resin.

The hot-melt adhesive composition may be produced by dry-blending 20 to 99% by mass of the above modified buten-1-based polymer and 80 to 1% by mass of the tackifier resin together with various optional additives, if required, using a Henschel mixer, etc., and then melt-kneading the resultant mixture using a single- or twin-screw extruder, a plastomill, a Banbury mixer, etc.

As the various optional additives, there may be used the above-mentioned plasticizers, inorganic fillers and antioxidants.

The buten-1-based polymer as a raw material to be modified by the process of the present invention may be produced by homopolymerizing buten-1, or copolymerizing buten-1 with a $C_2$ to $C_{20}$ α-olefin except for buten-1, in the presence of a metallocene catalyst.

The method of homopolymerizing buten-1 or the method of copolymerizing buten-1 with a $C_2$ to $C_{20}$ α-olefin except for buten-1, is conducted in the presence of the metallocene-based catalyst, preferably such a metallocene-based catalyst using a transition metal compound in which ligands thereof form a crosslinking structure via crosslinking groups, and more preferably such a metallocene-based catalyst using a transition metal compound in which the crosslinking structure is formed via two crosslinking groups, in combination with a co-catalyst More specifically, there may be used such a method of homopolymerizing buten-1, or copolymerizing buten-1 with a $C_2$ to $C_{20}$ α-olefin except for buten-1, in the presence of a metallocene-based catalyst comprising:

(A) a transition metal compound represented by the following general formula (I):

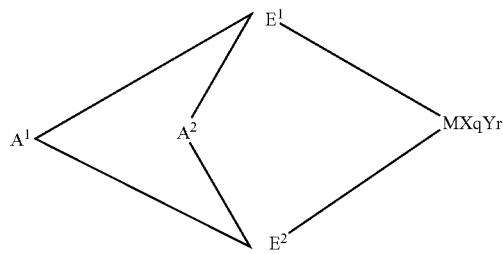

(I)

wherein M is a metal element belonging to Groups 3 to 10 or lanthanoid of the Period Table;

$E^1$ and $E^2$ are independently a ligand selected from the group consisting of substituted cyclopentadienyl, indenyl, substituted indenyl, heterocyclopentadienyl, substituted heterocyclopentadienyl, amide group, phosphide group, hydrocarbon groups and silicon-containing groups, which form a cross-linked structure via $A^1$ and $A^2$ and may be same or different from each other;

X is a ligand capable of forming a σ-bond with the proviso that when a plurality of X groups are present, these groups may be same or different from each other, and may be cross-linked with the other X group, $E^1$, $E^2$ or Y;

Y is a Lewis base with the proviso that when a plurality of Y groups are present, these groups may be same or different from each other, and may be cross-linked with the other Y group, $E^1$, $E^2$ or X;

$A^1$ and $A^2$ are divalent cross-linking groups capable of bonding the two ligands $E^1$ and $E^2$ to each other which may be same or different from each other, and are independently a $C_1$ to $C_{20}$ hydrocarbon group, a $C_1$ to $C_{20}$ halogen-containing hydrocarbon group, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$— or —AlR1— wherein $R^1$ is a hydrogen atom, a halogen atom, a $C_1$ to $C_{20}$ hydrocarbon group or a $C_1$ to $C_{20}$ halogen-containing hydrocarbon group;

q is an integer of 1 to 5 given by the formula:

[(valence of M)–2]; and r is an integer of 0 to 3, and (B) a component selected from the group consisting of (B-1) a compound capable of forming an ionic complex by reacting with said transition metal compound (A) or a derivative thereof, and (B-2) aluminoxane.

In the above general formula (I), M represents a metal element belonging to Groups 3 to 10 or lanthanoid of the Period Table. Specific examples of the metal element include titanium, zirconium, hafnium, yttrium, vanadium, chromium, manganese, nickel, cobalt, palladium and lanthanoid metals. Of these metal elements, preferred are titanium, zirconium and hafnium from the standpoint of a good catalytic activity for polymerization of olefins.

$E^1$ and $E^2$ are independently a ligand selected from the group consisting of substituted cyclopentadienyl, indenyl, substituted indenyl, heterocyclopentadienyl, substituted heterocyclopentadienyl, amide group (—N<), phosphine group (—P<), hydrocarbon groups (>CR—, >C<) and silicon-containing groups (>SiR—, >Si<) wherein R is hydrogen, a $C_1$ to $C_{20}$ hydrocarbon group or a hetero atom-containing group, and form a cross-linked structure via $A^1$ and $A^2$.

The ligands $E^1$ and $E^2$ may be same or different from each other.

Of these ligands $E^1$ and $E^2$, preferred are substituted cyclopentadienyl, indenyl and substituted indenyl.

X represents a ligand capable of forming a σ-bond. When a plurality of X groups are present, these X groups may be same or different from each other, and may be cross-linked with the other X group, $E^1$, $E^2$ or Y.

Specific examples of the ligand X include a halogen atom, a $C_1$ to $C_{20}$ hydrocarbon group, $C_1$ to $C_{20}$ alkoxy, $C_6$ to $C_{20}$ arylalkoxy, a $C_1$ to $C_{20}$ amide group, a $C_1$ to $C_{20}$ silicon-containing group, a $C_1$ to $C_{20}$ phosphide group, a $C_1$ to $C_{20}$ sulfide group and $C_1$ to $C_{20}$ acyl.

Y represents a Lewis base. When a plurality of Y groups are present, these Y groups may be same or different from each other, and may be cross-linked with the other Y group, $E^1$, $E^2$ or X.

Specific examples of the Lewis base as Y include amines, ethers, phosphines and thioethers.

$A^1$ and $A^2$ are divalent cross-linking groups capable of bonding the two ligands to each other which may be same or different from each other, and independently represent a $C_1$ to $C_{20}$ hydrocarbon group, a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein R$^1$ is a hydrogen at halogen atom, a $C_1$ to $C_{20}$ hydrocarbon group or a $C_1$ to $C_{20}$ halogen-containing hydrocarbon group.

The above cross-linking groups include, for example, compounds represented by the following general formula:

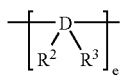

wherein D is carbon, silicon or tin; R$^2$ and R$^3$ are independently a hydrogen atom or a $C_1$ to $C_{20}$ hydrocarbon group, and may be same or different from each other and may be bonded to each other to form a ring; and e is an integer of 1 to 4. Specific examples of the cross-linking groups represented by the above formula include methylene, ethylene, ethylidene, propylidene, isopropylidene, cyclohexylidene, 1,2-cyclohexylene, vinylidene (CH$_2$=C=), dimethylsilylene, diphenylsilylene, methylphenylsilylene, dimethylgermylene, dimethylstannylene, tetramethyldisilylene and diphenyldisilylene.

Of these cross-linking groups, preferred are ethylene, isopropylidene and dimethylsilylene.

The symbol q is an integer of 1 to 5 given by the formula:

[(valence of M)–2], and r is an integer of 0 to 3.

Of these transition metal compounds represented by the above general formula (I), preferred are transition metal compounds having as a ligand, a double cross-linking type biscyclopentadienyl derivative represented by the following general formula (II):

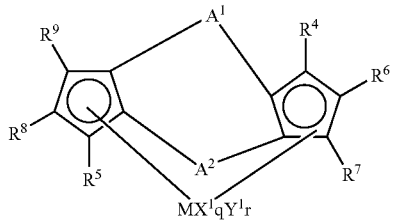

In the above general formula (II), M, A$^1$, A$^2$, q and r have the same definitions as described in the above formula (I).

X$^1$ is a ligand capable of forming a σ-bond, and when a plurality of X$^1$ groups are present, these X$^1$ groups may be same or different from each other and may be cross-linked with the other X$^1$ group or Y$^1$.

Specific examples of the X$^1$ groups are the same as exemplified above as to X of the general formula (I).

Y$^1$ is a Lewis base, and when a plurality Of Y$^1$ groups are present, these Y$^1$ groups may be same or different from each other and may be cross-linked with the other Y$^1$ group or X$^1$.

Specific examples of the Y$^1$ groups are the same as exemplified above as to Y of the general formula (I).

R$^4$ to R$^9$ are independently a hydrogen atom, a halogen atom, a $C_1$ to $C_{20}$ hydrocarbon group, a $C_1$ to $C_{20}$ halogen-containing hydrocarbon group, a silicon-containing group or a hetero atom-containing group. However, at least one of R$^4$ to R$^9$ is required to be a group other than hydrogen.

Also, R$^4$ to R$^9$ may be same or different from each other, and adjacent two thereof may be bonded to each other to form a ring.

In particular, R$^6$ and R$^7$ as well as R$^8$ and R$^9$ are preferably bonded to each other to form a ring.

R$^4$ and R$^5$ are preferably selected from groups containing a hetero atom such as oxygen, halogen and silicon, because the resultant catalyst can exhibit a high polymerization activity.

The transition metal compound having double cross-linking type biscyclopentadienyl derivatives as ligands preferably contains silicon in the crosslinking group between the ligands.

Specific examples of the transition metal compounds represented by the general formula (I) include
(1,2'-ethylene)(2,1'-ethylene)-bis(indenyl)zirconium dichloride,
(1,2'-methylene)(2,1'-methylene)-bis(indenyl)zirconium dichloride,
(1,2'-isopropylidene)(2,1'-isopropylidene)-bis(indenyl)zirconium dichloride,
(1,2'-ethylene)(2,1'-ethylene)-bis(3-methylindenyl)zirconium dichloride,
(1,2'-ethylene)(2,1'-ethylene)-bis(4,5-benzoindenyl)zirconium dichloride,
(1,2'-ethylene)(2,1'-ethylene)-bis(4-isopropylindenyl)zirconium dichloride,
(1,2'-ethylene)(2,1'-ethylene)-bis(5,6-dimethylindenyl)zirconium dichloride,
(1,2'-ethylene)(2,1'-ethylene)-bis(4,7-diisopropylindenyl) zirconium dichloride,
(1,2'-ethylene)(2,1'-ethylene)-bis(4-phenylindenyl)zirconium dichloride,
(1,2'-ethylene)(2,1'-ethylene)-bis(3-methyl-4-isopropylindenyl)zirconium dichloride,
(1,2'-ethylene)(2,1'-ethylene)-bis(5,6-benzoindenyl)zirconium dichloride,
(1,2'-ethylene)(2,1'-isopropylidene)-bis(indenyl)zirconium dichloride,
(1,2'-methylene)(2,1'-ethylene)-bis(indenyl)zirconium dichloride,
(1,2'-methylene)(2,1'-isopropylidene)-bis(indenyl)zirconium dichloride,
(1,2'-dimethylsilylene)(2,1'-dimethylsilylene)-bis(indenyl) zirconium dichloride,
(1,2'-dimethylsilylene)(2,1'-dimethylsilylene)-bis(3-methylindenyl)zirconium dichloride,
(1,2'-dimethylsilylene)(2,1'-dimethylsilylene)-bis(3-n-butylindenyl)zirconium dichloride,
(1,2'-dimethylsilylene)(2,1'-dimethylsilylene)-bis(3-i-propylindenyl)zirconium dichloride,
(1,2'-dimethylsilylene)(2,1'-dimethylsilylene)-bis(3-trimethylsilylmethylindenyl) zirconium dichloride,
(1,2'-dimethylsilylene)(2,1'-dimethylsilylene)-bis(3-phenylindenyl)zirconium dichloride,
(1,2'-dimethylsilylene)(2,1'-dimethylsilylene)-bis(4,5-benzoindenyl)zirconium dichloride,
(1,2'-dimethylsilylene)(2,1'-dimethylsilylene)-bis(4-isopropylindenyl)zirconium dichloride,
(1,2'-dimethylsilylene)(2,1'-dimethylsilylene)-bis(5,6-dimethylindenyl)zirconium dichloride,
(1,2'-dimethylsilylene)(2,1'-dimethylsilylene)-bis(4,7-di-1-propylindenyl)zirconium dichloride,
(1,2'-dimethylsilylene)(2,1'-dimethylsilylene)-bis(4-phenylindenyl)zirconium dichloride, (1,2'-dimethylsilylene)(2,1'-dimethylsilylene)-bis(3-methyl-4-i-propylindenyl)zirconium dichloride,
(1,2'-dimethylsilylene)(2,1'-dimethylsilylene)-bis(5,6-benzoindenyl)zirconium dichloride, (1,2'-dimethylsilylene)(2,1'-isopropylidene)-bis(indenyl)zirconium dichloride,
(1,2'-dimethylsilylene)(2,1'-isopropylidene)-bis(3-methylindenyl)zirconium dichloride,
(1,2'-dimethylsilylene)(2,1'-isopropylidene)-bis(3-i-propylindenyl)zirconium dichloride,
(1,2'-dimethylsilylene)(2,1'-isopropylidene)-bis(3-n-butylindenyl)zirconium dichloride,
(1,2'-dimethylsilylene)(2,1'-isopropylidene)-bis(3-trimethylsilylmethylindenyl)zirconium dichloride,
(1,2'-dimethylsilylene)(2,1'-isopropylidene)-bis(3-trimethylsilylindenyl)zirconium dichloride,
(1,2'-dimethylsilylene)(2,1'-isopropylidene)-bis(3-phenylindenyl)zirconium dichloride,
(1,2'-dimethylsilylene)(2,1'-methylene)-bis(indenyl)zirconium dichloride,
(1,2'-dimethylsilylene)(2,1'-methylene)-bis(3-methylindenyl)zirconium dichloride,
(1,2'-dimethylsilylene)(2,1'-methylene)-bis(3-i-propylindenyl)zirconium dichloride,
(1,2'-dimethylsilylene)(2,1'-methylene)-bis(3-n-butylindenyl)zirconium dichloride,
(1,2'-dimethylsilylene)(2,1'-methylene)-bis(3-trimethylsilylmethylindenyl)zirconium dichloride,
(1,2'-dimethylsilylene)(2,1'-methylene)-bis(3-trimethylsilylindenyl)zirconium dichloride,
(1,2'-diphenylsilylene)(2,1'-methylene)-bis(indenyl)zirconium dichloride,
(1,2'-diphenylsilylene)(2,1'-methylene)-bis(3-methylindenyl)zirconium dichloride,
(1,2'-diphenylsilylene)(2,1'-methylene)-bis(3-i-propylindenyl)zirconium dichloride,
(1,2'-diphenylsilylene)(2,1'-methylene)-bis(3-n-butylindenyl)zirconium dichloride,
(1,2'-diphenylsilylene)(2,1'-methylene)-bis(3-trimethylsilylmethylindenyl)zirconium dichloride,
(1,2'-diphenylsilylene)(2,1'-methylene)-bis(3-trimethylsilylindenyl)zirconium dichloride,
(1,2'-dimethylsilylene)(2,1'-dimethylsilylene)(3-methylcyclopentadienyl) (3'-methylcyclopentadienyl)zirconium dichloride,
(1,2'-dimethylsilylene)(2,1'-isopropylidene)(3-methylcyclopentadienyl) (3'-methylcyclopentadienyl)zirconium dichloride,
(1,2'-dimethylsilylene)(2,1'-ethylene)(3-methylcyclopentadienyl) (3'-methylcyclopentadienyl)zirconium dichloride,
(1,2'-ethylene)(2,1'-methylene)(3-methylcyclopentadienyl) (3'-methylcyclopentadienyl)zirconium dichloride,
(1,2'-ethylene)(2,1'-isopropylidene)(3-methylcyclopentadienyl) (3'-methylcyclopentadienyl)zirconium dichloride,
(1,2'-methylene)(2,1'-methylene)(3-methylcyclopentadienyl) (3'-methylcyclopentadienyl)zirconium dichloride,
(1,2'-methylene)(2,1'-isopropylidene)(3-methylcyclopentadienyl) (3'-methylcyclopentadienyl)zirconium dichloride,
(1,2'-isopropylidene)(2,1'-isopropylidene)(3-methylcyclopentadienyl) (3'-methylcyclopentadienyl)zirconium dichloride,
(1,2'-dimethylsilylene)(2,1'-dimethylsilylene)(3,4-dimethylcyclopentadienyl) (3',4'-dimethylcyclopentadienyl)zirconium dichloride,
(1,2'-dimethylsilylene)(2,1'-isopropylidene)(3,4-dimethylcyclopentadienyl) (3',4'-dimethylcyclopentadienyl)zirconium dichloride,
(1,2'-dimethylsilylene)(2,1'-ethylene)(3,4-dimethylcyclopentadienyl) (3',4'-dimethylcyclopentadienyl)zirconium dichloride,
(1,2'-ethylene)(2,1'-methylene)(3,4-dimethylcyclopentadienyl) (3',4'-dimethylcyclopentadienyl)zirconium dichloride,
(1,2'-ethylene)(2,1'-isopropylidene)(3,4-dimethylcyclopentadienyl) (3',4'-dimethylcyclopentadienyl)zirconium dichloride,
(1,2'-mehylene)(2,1'-methylene)(3,4-dimethylcyclopentadienyl) (3',4'-dimethylcyclopentadienyl)zirconium dichloride,
(1,2'-methylene)(2,1'-isopropylidene)(3,4-dimethylcyclopentadienyl) (3',4'-dimethylcyclopentadienyl)zirconium dichloride,
(1,2'-isopropylidene)(2,1'-isopropylidene)(3,4-dimethylcyclopentadienyl) (3',4'-dimethylcyclopentadienyl)zirconium dichloride,
(1,2'-dimethylsilylene)(2,1'-dimethylsilylene)(3-methyl-5-ethylcyclopentadienyl) (3'-methyl-5'-ethylcyclopentadienyl)zirconium dichloride,
(1,2'-dimethylsilylene)(2,1'-dimethylsilylene)(3-methyl-5-ethylcyclopentadienyl) (3'-methyl-5'-ethylcyclopentadienyl)zirconium dichloride,
(1,2'-dimethylsilylene)(2,1'-dimethylsilylene)(3-methyl-5-isopropylcyclopentadienyl) (3'-methyl-5'-isopropylcyclopentadienyl)zirconium dichloride,
(1,2'-dimethylsilylene)(2,1'-dimethylsilylene)(3-methyl-5-n-butylcyclopentadienyl) (3'-methyl-5'-n-butylcyclopentadienyl)zirconium dichloride,
(1,2'-dimethylsilylene)(2,1'-dimethylsilylene)(3-methyl-5-phenylcyclopentadienyl) (3'-methyl-5'-phenylcyclopentadienyl)zirconium dichloride,
(1,2'-dimethylsilylene)(2,1'-isopropylidene)(3-methyl-5-ethylcyclopentadienyl) (3'-methyl-5'-ethylcyclopentadienyl)zirconium dichloride,
(1,2'-dimethylsilylene)(2,1'-isopropylidene)(3-methyl-5-i-propylcyclopentadienyl) (3'-methyl-5'-1-propylcyclopentadienyl)zirconium dichloride,
(1,2'-dimethylsilylene)(2,1'-isopropylidene)(3-methyl-5-n-butylcyclopentadienyl) (3'-methyl-5'-n-butylcyclopentadienyl)zirconium dichloride,
(1,2'-dimethylsilylene)(2,1'-isopropylidene)(3-methyl-5-phenylcyclopentadienyl) (3'-methyl-5'-phenylcyclopentadienyl)zirconium dichloride,
(1,2'-dimethylsilylene)(2,1'-ethylene)(3-methyl-5-ethylcyclopentadienyl) (3'-methyl-5'-ethylcyclopentadienyl)zirconium dichloride,
(1,2'-dimethylsilylene)(2,1'-ethylene)(3-methyl-5-i-propylcyclopentadienyl) (3'-methyl-5'-1-propylcyclopentadienyl)zirconium dichloride,
(1,2'-dimethylsilylene)(2,1'-ethylene)(3-methyl-5-n-butylcyclopentadienyl) (3'-methyl-5'-n-butylcyclopentadienyl) zirconium dichloride,
(1,2'-dimethylsilylene)(2,1'-ethylene)(3-methyl-5-phenylcyclopentadienyl) (3'-methyl-5'-phenylcyclopentadienyl) zirconium dichloride,
(1,2'-dimethylsilylene)(2,1'-methylene)(3-methyl-5-ethylcyclopentadienyl) (3'-methyl-5'-ethylcyclopentadienyl) zirconium dichloride,
(1,2'-dimethylsilylene)(2,1'-methylene)(3-methyl-5-i-propylcyclopentadienyl) (3'-methyl-5'-1-propylcyclopentadienyl)zirconium dichloride,
(1,2'-dimethylsilylene)(2,1'-methylene)(3-methyl-5-n-butylcyclopentadienyl) (3'-methyl-5'-n-butylcyclopentadienyl) zirconium dichloride, (1,2'-dimethylsilylene)(2,1'-methylene)(3-methyl-5-phenyl-cyclopentadienyl) (3'-methyl-5'-phenylcyclopentadienyl) zirconium dichloride,
(1,2'-ethylene)(2,1'-methylene)(3-methyl-5-i-propylcyclo-pentadienyl) (3'-methyl-5'-1-propylcyclopentadienyl)zirconium dichloride,
(1,2'-ethylene)(2,1'-isopropylidene)(3-methyl-5-i-propylcyclopentadienyl) (3'-methyl-5'-1-propylcyclopentadienyl) zirconium dichloride,
(1,2'-methylene)(2,1'-methylene)(3-methyl-5-i-propylcyclopentadienyl) (3'-methyl-5'-1-propylcyclopentadienyl)zirconium dichloride,
(1,2'-methylene)(2,1'-isopropylidene)(3-methyl-5-i-propyl-cyclopentadienyl) (3'-methyl-5'-1-propylcyclopentadienyl)zirconium dichloride,
(1,1'-dimethylsilylene) (2,2'-dimethylsilylene)bisindenyl zirconium dichloride,
(1,1'-diphenylsilylene) (2,2'-dimethylsilylene)bisindenyl zirconium dichloride,
(1,1'-dimethylsilylene) (2,2'-dimethylsilylene)bisindenyl zirconium dichloride,
(1,1'-diisopropylsilylene) (2,2'-dimethylsilylene)bisindenyl zirconium dichloride,
(1,1'-dimethylsilylene) (2,2'-diisopropylsilylene)bisindenyl zirconium dichloride,
(1,1'-dimethylsilyleneindenyl) (2,2'-dimethylsilylene-3-trimethylsilylindenyl) zirconium dichloride, (1,1'-diphenyl-silylindenyl) (2,2'-diphenylsilylene-3-trimethylsilylindenyl)zirconium dichloride,
(1,1'-diphenylsilyleneindenyl) (2,2'-dimethylsilylene-3-trimethylsilylindenyl) zirconium dichloride,
(1,1'-dimethylsilyleneindenyl) (2,2'-diphenylsilylene-3-trimethylsilylindenyl)zirconium dichloride,
(1,1'-diisopropylsilyleneindenyl) (2,2'-dimethylsilylene-3-trimethylsilylindenyl) zirconium dichloride,
(1,1'-dimethylsilyleneindenyl) (2,2'-diisopropylsilylene-3-trimethylsilylindenyl)zirconium dichloride,
(1,1'-diisopropylsilyleneindenyl) (2,2'-diisopropylsilylene-3-trimethylsilylindenyl)zirconium dichloride,
(1,1'-dimethylsilyleneindenyl) (2,2'-dimethylsilylene-3-trimethylsilylmethylindenyl)zirconium dichloride,
(1,1'-diphenylsilyleneindenyl) (2,2'-diphenylsilylene-3-trimethylsilylmethylindenyl)zirconium dichloride,
(1,1'-diphenylsilyleneindenyl) (2,2'-dimethylsilylene-3-trimethylsilylmethylindenyl)zirconium dichloride,
(1,1'-dimethylsilyleneindenyl) (2,2'-diphenylsilylene-3-trimethylsilylmethylindenyl)zirconium dichloride,
(1,1'-diisopropylsilyleneindenyl) (2,2'-dimethylsilylene-3-trimethylsilylmethylindenyl)zirconium dichloride,
(1,1'-dimethylsilyleneindenyl) (2,2'-diisopropylsilylene-3-trimethylmethylsilylindenyl)zirconium dichloride and
(1,1'-diisopropylsilyleneindenyl) (2,2'-diisopropylsilylene-3-trimethylmethylsilylindenyl)zirconium dichloride, as well as compounds obtained by replacing zirconium of the above-described compounds with titanium or hafnium, though not limited thereto.

Further, similar compounds containing metal elements belonging to the other Groups or lanthanoid series of the Periodic Table may also be used as the component (A) in the present invention.

Also, in the above compounds, the (1,1'-) (2,2'-) substituted compounds may be replaced with (1,2'-) (2,1'-) substituted compounds, and the (1,2'-) (2,1'-) substituted compounds may be replaced with (1,1'-) (2,2'-) substituted compounds.

As the component (B-1) contained in the component (B), any suitable compounds can be used as long as they are capable of forming an ionic complex by reacting with the above transition metal compound (A). The compounds suitably used as the component (B-1) are those represented by the following general formulae (III) and (IV):

$$([L^1-R^{10}]^{k+})_a([Z]^-)_b \quad (III)$$

$$([L^2]^{k+})_a([Z]^-)_b \quad (IV)$$

wherein $L^2$ is $M^2$, $R^{11}R^{12}M^3$, $R^{13}_3C$ or $R^{14}M^3$.

In the above general formulae (III) and (IV), $L^1$ represents a Lewis base; $[Z]^-$ represents a non-coordinated anion $[Z^1]^-$ or $[Z^2]^-$ wherein $[Z^1]^-$ is an anion containing a plurality of groups bonded to an element, i.e., $[M^1G^1G^2 \ldots G^f]^-$ wherein $M^1$ is an element selected from the group consisting of elements belonging to Groups 5 to 15 and preferably Groups 13 to 15 of the Periodic Table; $G^1$ to $G^f$ are respectively a hydrogen atom, a halogen atom, $C_1$ to $C_{20}$ alkyl, $C_2$ to $C_{40}$ dialkylamino, $C_1$ to $C_{20}$ alkoxy, $C_6$ to $C_{20}$ aryl, $C_6$ to $C_{20}$ aryloxy, $C_7$ to $C_{40}$ alkylaryl, $C_7$ to $C_{40}$ arylalkyl, a $C_1$ to $C_{20}$ halogen-substituted hydrocarbon group, $C_1$ to $C_{20}$ acyloxy, an organometalloid group or a $C_2$ to $C_{20}$ hetero atom-containing hydrocarbon group, and at least two of $G^1$ to $G^f$ may be bonded to each other to form a ring; f is an integer given by the formula: [(valence of the $M^1$ as a center metal)+1]; $[Z^2]^-$ is a conjugated base composed of Brønsted acid showing a logarithm of inverse number of acid dissociation constant (pKa) of −10 or less solely or a combination of the Brønsted acid and a Lewis acid, or a conjugated base of acids generally defined as superstrong acids, and may be coordinated with a Lewis base; $R^{10}$ is a hydrogen atom, $C_1$ to $C_{20}$ alkyl or $C_6$ to $C_{20}$ aryl, alkylaryl or arylalkyl; $R^{11}$ and $R^{12}$ are respectively cyclopentadienyl, substituted cyclopentadienyl, indenyl or fluorenyl; $R^{13}$ is $C_1$ to $C_{20}$ alkyl, aryl, alkylaryl or arylalkyl; $R^{14}$ is a macrocyclic ligand such as tetraphenyl porphyrin and phthalocyanine; k represents an ionic valence of $[L^1-R^{10}]$ or $[L^2]$, i.e., an integer of 1 to 3; a is an integer of 1 or more; b is a number of (k×a); $M^2$ represents an element selected from the group consisting of elements belonging to Groups 1 to 3, 11 to 13 and 17 of the Periodic Table; and $M^3$ represents an element selected from the group consisting of elements belonging to Groups 7 to 12 of the Periodic Table.

Specific examples of the $L^1$ include amines such as ammonia, methyl amine, aniline, dimethyl amine, diethyl amine, N-methyl aniline, diphenyl amine, N,N-dimethyl aniline, trimethyl amine, triethyl amine, tri-n-butyl amine, methyldiphenyl amine, pyridine, p-bromo-N,N-dimethyl aniline and p-nitro-N,N-dimethyl aniline; phosphines such as triethyl phosphine, triphenyl phosphine and diphenyl phosphine; thioethers such as tetrahydrothiophene; esters such as ethyl benzoate; and nitriles such as acetonitrile and benzonitrile.

Specific examples of the $R^{10}$ include hydrogen, methyl, ethyl, benzyl and trityl. Specific examples of the $R^{11}$ and $R^{12}$ include cyclopentadienyl, methyl cyclopentadienyl, ethyl cyclopentadienyl and pentamethyl cyclopentadienyl.

Specific examples of the $R^{13}$ include phenyl and p-tolyl, p-methoxyphenyl. Specific examples of the $R^{14}$ include tetraphenyl porphyrin, phthalocyanine, allyl and methallyl.

Specific examples of the $M^2$ include Li, Na, K, Ag, Cu, Br, I and $I_3$. Specific examples of the $M^3$ include Mn, Fe, Co, Ni and Zn.

In the $[Z^1]^-$, i.e., $[M^1G^1G^2 \ldots G^f]^-$, specific examples of the $M^1$ include B, AL, Si, P, As and Sb. Of these elements, preferred are B and Al.

Specific examples of the $G^1$ and $G^2$ to $G^f$ include dialkylamino groups such as dimethylamino and diethylamino;

alkoxy or aryloxy groups such as methoxy, ethoxy, n-butoxy and phenoxy; hydrocarbon groups such as methyl, ethyl, n-propyl, isopropyl, n-butyl, isobutyl, n-octyl, n-eicosyl, phenyl, p-tolyl, benzyl, 4-t-butylphenyl and 3,5-dimethylphenyl; halogen atoms such as fluorine, chlorine, bromine and iodine; hetero atom-containing hydrocarbon groups such as p-fluorophenyl, 3,5-difluorophenyl, pentachlorophenyl, 3,4,5-trifluorophenyl, pentafluorophenyl, 3,5-bis(trifluoromethyl)phenyl and bis(trimethylsilyl)methyl; and organometalloid groups such as pentamethyl antimony, trimethylsilyl, trimethylgermyl, diphenyl arsine, dicyclohexyl antimony and diphenyl boron.

Specific examples of the non-coordinated anion, i.e., the conjugated base $[Z^2]^-$ composed of Brønsted acid having a pKa of −10 or less solely or a combination of the Brønsted acid and a Lewis acid, include trifluoromethanesulfonic acid anion $[(CF_3SO_3)^-]$, bis(trifluoromethanesulfonyl)methyl anion, bis(trifluoromethanesulfonyl)benzyl anion, bis(trifluoromethanesulfonyl)amide, perchloric acid anion $[(ClO_4)^-]$, trifluoroacetic acid anion $[(CF_3CO_2)^-]$, hexafluoroantimony anion $[(SbF_6)^-]$, fluorosulfonic acid anion $[(FSO_3)^-]$, chlorosulfonic acid anion $[(ClSO_3)^-]$, fluorosulfonic acid/antimony pentafluoride anion $[(FSO_3/SbF_5)^-]$, fluorosulfonic acid/arsenic pentafluoride anion $[(FSO_3/AsF_5)^-]$ and trifluoromethanesulfonic acid/antimony pentafluoride anion $[(CF_3SO_3/SbF_5)^-]$.

Specific examples of the ionic compound capable of forming an ionic complex by reacting with the above transition metal compound as the component (A), i.e., the component (B-1), include triethyl ammonium tetraphenylborate, tri-n-butyl ammonium tetraphenylborate, trimethyl ammonium tetraphenylborate, tetraethyl ammonium tetraphenylborate, methyl(tri-n-butyl)ammonium tetraphenylborate, benzyl(tri-n-butyl) ammonium tetraphenylborate, dimethyldiphenyl ammonium tetraphenylborate, triphenyl(methyl)ammonium tetraphenylborate, trimethyl anilinium tetraphenylborate, methylpyridinium tetraphenylborate, benzyl pyridinium tetraphenylborate, methyl(2-cyanopyridinium)tetraphenylborate, triethyl ammonium tetrakis(pentafluorophenyl)borate, tri-n-butyl ammonium tetrakis(pentafluorophenyl)borate, triphenyl ammonium tetrakis(pentafluorophenyl)borate, tetra-n-butyl ammonium tetrakis(pentafluorophenyl)borate, tetraethyl ammonium tetrakis(pentafluorophenyl)borate, benzyl(tri-n-butyl)ammonium tetrakis(pentafluorophenyl)borate, methyldiphenyl ammonium tetrakis(pentafluorophenyl)borate, triphenyl(methyl)ammonium tetrakis(pentafluorophenyl)borate, methyl anilinium tetrakis(pentafluorophenyl)borate, dimethyl anilinium tetrakis(pentafluorophenyl)borate, trimethyl anilinium tetrakis(pentafluorophenyl)borate, methyl pyridinium tetrakis(pentafluorophenyl)borate, benzyl pyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenyl phosphonium tetrakis(pentafluorophenyl)borate, dimethyl anilinium tetrakis[bis(3,5-di-trifluoromethyl)phenyl]borate, ferrocenium tetraphenylborate, silver tetraphenylborate, trityl tetraphenylborate, tetraphenyl porphyrin manganese tetraphenylborate, ferrocenium tetrakis(pentafluorophenyl)borate, (1,1'-dimethyl ferrocenium) tetrakis(pentafluorophenyl)borate, decamethyl ferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenyl porphyrin manganese tetrakis(pentafluorophenyl)borate, silver tetrafluoroborate, silver hexafluorophosphate, silver hexafluoroarsenate, silver perchlorate, silver trifluoroacetate and silver trifluoromethanesulfonate.

These ionic compounds as the components (B-1) may be used alone or in the form of a mixture of any two or more thereof.

Examples of the aluminoxanes as the component (B-2) include chain-like aluminoxanes represented by the following general formula (V):

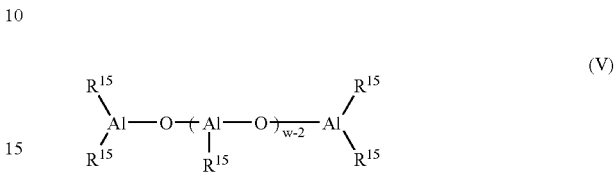

wherein $R^{15}$ is a hydrocarbon group such as $C_1$ to $C_{20}$, preferably $C_1$ to $C_{12}$ alkyl, alkenyl, aryl and arylalkyl, or a halogen atom; w represents an average polymerization degree, i.e., an integer of usually 2 to 50, preferably 2 to 40; and the respective $R^{15}$ groups may be the same or different from each other, and cyclic aluminoxanes represented by the following general formula (VI):

$$\left[\begin{array}{c} Al-O \\ | \\ R^{15} \end{array}\right]_w \quad (VI)$$

wherein $R^{15}$ and w are the same as defined above.

The above aluminoxanes may be produced by contacting alkyl aluminum with a condensing agent such as water. The contact method is not particularly limited, and these compounds may be contacted and reacted with each other by any known methods.

Examples of the method for production of the aluminoxanes include (1) the method of dissolving the organoaluminum compound in an organic solvent, and then contacting the resultant solution with water; (2) the method of first adding the organoaluminum compound upon the polymerization, and subsequently adding water thereto; (3) the method of reacting crystal water contained in metal salts or the like, or water adsorbed in inorganic or organic substances, with the organoaluminum compound; and (4) the method of reacting tetraalkyl dialuminoxane with trialkyl aluminum, and further reacting the reaction product with water.

The aluminoxanes may be insoluble in toluene. These aluminoxanes may be used alone or in the form of a mixture of any two or more thereof.

When using the component (B-1) as the catalyst component (B), the molar ratio of the component (A) to the component (B-1) is preferably 10:1 to 1:100 and more preferably 2:1 to 1:10. If the molar ratio of the component (A) to the component (B-1) is out of the above-specified range, the cost performance of the catalyst per unit weight of the obtained polymer tends to be deteriorated, and the use of such a catalyst is therefore unpractical.

When using the component (B-2) as the catalyst component (B), the molar ratio of the component (A) to the component (B-2) is preferably 1:1 to 1:1,000,000 and more preferably 1:10 to 1:10,000. If the molar ratio of the component (A) to the component (B-2) is out of the above-specified range, the cost performance of the catalyst per unit weight of the obtained polymer tends to be deteriorated, and the use of such a catalyst is therefore unpractical.

As the component (B), the components (B-1) and (B-2) may be used alone or in the combination of any two or more thereof.

The polymerization catalyst used in the process for producing the buten-1-based polymer used in the present invention may further contain an organoaluminum compound as a component (C) in addition to the components (A) and (B).

As the organoaluminum compound (C), there may be used compounds represented by the general formula (VII):

$$R^{16}_v AlJ_{3-v} \quad (VII)$$

wherein $R^{16}$ is $C_1$ to $C_{10}$ alkyl; J is a hydrogen atom, $C_1$ to $C_{20}$ alkoxy, $C_6$ to $C_{20}$ aryl or a halogen atom; v is an integer of 1 to 3.

Specific examples of the compounds represented by the above general formula (VII) include trimethyl aluminum, triethyl aluminum, triisopropyl aluminum, triisobutyl aluminum, dimethyl aluminum chloride, diethyl aluminum chloride, methyl aluminum dichloride, ethyl aluminum dichloride, dimethyl aluminum fluoride, diisobutyl aluminum hydride, diethyl aluminum hydride and ethyl aluminum sesquichloride.

These organoaluminum compounds may be used alone or in the combination of any two or more thereof.

In the process for production of the buten-1-based polymer used in the present invention, the above described components (A), (B) and (C) may be preliminarily contacted with each other.

The preliminary contact may be performed, for example, by contacting the component (A) with the component (B), but is not particularly limited and may be conducted by any known method.

The preliminary contact is effective to improve the catalytic activity, reduce the amount of the component (B) as a co-catalyst, and reduce the costs required for the catalyst.

Also, when the components (A) and (B-2) are contacted with each other, in addition to the above effects, there can be attained such an effect of increasing a molecular weight of the obtained polymer.

The preliminary contact temperature is usually in the range of −20 to 200° C., preferably −10 to 150° C. and more preferably 0 to 80° C.

The preliminary contact may also be conducted in the presence of an inert hydrocarbon solvent such as aliphatic hydrocarbons and aromatic hydrocarbons.

Of these solvents, especially preferred are aliphatic hydrocarbons.

The molar ratio of the catalyst component (A) to the catalyst component (C) is preferably in the range of from 1:1 to 1:10,000, more preferably from 1:5 to 1:2,000 and still more preferably from 1:10 to 1:1,000.

The use of the organoaluminum compound as the component (C) can enhance a polymerization activity per unit quantity of transition metal used. However, the use of a too large amount of the component (C) is uneconomical and rather tends to cause such a disadvantage that a large amount of the component (C) remains in the obtained polymer.

In the present invention, at least one of the catalyst components may be supported on a suitable carrier.

The catalyst carrier usable in the present invention is not particularly limited, and may be selected from any suitable materials such as inorganic oxides, other inorganic materials and organic materials. Of these catalyst carriers, preferred are those carriers made of inorganic oxides or other inorganic materials.

Specific examples of the inorganic oxides used as the catalyst carrier include $SiO_2$, $Al_2O_3$, MgO, $ZrO_2$, $TiO_2$, $Fe_2O_3$, $B_2O_3$, CaO, ZnO, BaO, $ThO_2$ or mixtures thereof such as silica alumina, zeolite, ferrite and glass fibers.

Of these inorganic oxides, especially preferred are $SiO_2$ and $Al_2O_3$.

The catalyst carriers made of the inorganic oxides may contain a small amount of carbonates, nitrates, sulfates or the like.

Examples of the other inorganic materials as the catalyst carrier include magnesium compounds represented by the general formula: $MgR^{17}_x X^2_y$ such as, typically, $MgCl_2$ and $Mg(OC_2H_5)_2$, or complex salts thereof.

In the above general formula, $R^{17}$ is $C_1$ to $C_{20}$ alkyl, $C_1$ to $C_{20}$ alkoxy or $C_6$ to $C_{20}$ aryl; $X^2$ is a halogen atom or $C_1$ to $C_{20}$ alkyl; x is a number of 0 to 2, and y is a number of 0 to 2 with the proviso that (x+y) is 2. The respective $R^{17}$ groups or $X^2$ groups may be the same or different from each other.

Examples of the organic materials used as the catalyst carrier include polymers such as polystyrene, styrene-divinylbenzene copolymer, polyethylene, poly-1-butene, substituted polystyrene and polyarylates, starch and carbon.

Of the above catalyst carriers used in the present invention, preferred are $MgCl_2$, $MgCl(OC_2H_5)$, $Mg(OC_2H_5)_2$, $SiO_2$ and $Al_2O_3$.

Although the properties of the catalyst carrier may vary depending upon kind and production method thereof, the catalyst carrier has an average particle size of usually 1 to 300 μm, preferably 10 to 200 μm and more preferably 20 to 100 μm.

The too small particle size of the catalyst carrier tends to increase the amount of fine powder contained in the polymer, and the too large particle size thereof tends to increase the amount of coarse particles contained in the polymer, resulting in reduced bulk density of the polymer or clogging of a hopper.

The catalyst carrier has a specific surface area of usually 1 to 1,000 m²/g, preferably 50 to 500 m²/g, and a pore volume of usually 0.1 to 5 m³/g, preferably 0.3 to 3 m³/g.

When the specific surface area or pore volume of the catalyst carrier is out of the above-specified range, the catalyst activity tends to be deteriorated.

The specific surface area and pore volume is determined, for example, from a volume of nitrogen gas absorbed according to BET method.

Further, the carriers made of the inorganic oxides are preferably calcined at a temperature of usually 150 to 1,000° C. and preferably 200 to 800° C.

When at least one of the catalyst components is supported on the carrier, at least one of the catalyst components (A) and (B), preferably both thereof, may be desirably supported thereon.

Said at least one of the catalyst components (A) and (B) may be supported on the carrier by any suitable method without particular limitations. For example, the suitable supporting methods are as follows:

(1) Method of mixing at least one of the components (A) and (B) with the carrier;

(2) Method of treating the carrier with an organoaluminum compound or a halogen-containing silicon compound, and then mixing the thus-treated carrier with at least one of the components (A) and (B) in an inert solvent;

(3) Method of reacting the carrier, the component (A) and/or the component (B), and an organoaluminum compound or a halogen-containing silicon compound with each other;

(4) Method of supporting one of the component (A) and the component (B) on the carrier, and then mixing the carrier with the other of the component (A) and the component (B);

(5) Method of mixing a reaction product obtained by contacting the component (A) with the component (B), with the carrier; and (6) Method of contacting and reacting the component (A) and the component (B) with each other under the coexistence of the carrier.

In the above methods (4), (5) and (6), the organoaluminum compound as the component (C) may be added to the reaction system.

The catalyst of the present invention may be prepared by irradiating an elastic wave on the components (A), (B) and (C) upon the contact therebetween.

As the elastic wave, there may be usually used a sound wave and preferably an ultrasonic wave.

More specifically, the ultrasonic wave having a frequency of 1 to 1,000 kHz and preferably 10 to 500 kHz is suitably used.

The thus-obtained catalyst may be used in the polymerization after distilling off the solvent therefrom to obtain a solid catalyst component, or may be directly applied to the polymerization.

Alternatively, in the present invention, the catalyst may be produced by supporting at least one of the component (A) and the component (B) on the carrier in the polymerization reaction system.

For example, after adding at least one of the component (A) and the component (B) together with the carrier and, if required, the organoaluminum compound as the optional component (C), olefin such as ethylene is added until reaching a pressure of from ordinary pressure to 2 MPa (gauge), and pre-polymerized at a temperature of −20 to 200° C. for about 1 min to about 2 h to obtain catalyst particles.

In the present invention, the weight ratio of the component (B-1) to the carrier is preferably in the range of from 1:5 to 1:10,000 and more preferably from 1:10 to 1:500, and the weight ratio of the component (B-2) to the carrier is preferably in the range of from 1:0.5 to 1:1000 and more preferably from 1:1 to 1:50.

When the component (B) is in the form of a mixture of any two or more kinds thereof, the weight ratio of each of the components (B) to the carrier preferably lies within the above-specified range.

Also, the weight ratio of the component (A) to the carrier is preferably in the range of from 1:5 to 1:10000 and more preferably from 1:10 to 1:500.

If the weight ratio of the component (B), i.e., the component (B-1) or the component (B-2), to the carrier, or the weight ratio of the component (A) to the carrier is out of the above-specified range, the catalytic activity of the obtained catalyst tends to be deteriorated.

The thus-prepared polymerization catalyst of the present invention has an average particle size of usually 2 to 200 μm, preferably 10 to 150 μm and more preferably 20 to 100 μm, and a specific surface area of usually 20 to 1000 m$^2$/g and preferably 50 to 500 m$^2$/g.

If the average particle size of the catalyst is less than 2 μm, the amount of fine powder contained in the obtained polymer tends to be increased. If the average particle size of the catalyst exceeds 200 μm, the amount of coarse particles contained in the obtained polymer tends to be increased.

If the specific surface area of the catalyst is less than 20 m$^2$/g, the catalytic activity thereof tends to be deteriorated. If the specific surface area of the catalyst exceeds 1000 m$^2$/g, the obtained polymer tends to be lowered in bulk density.

Also, in the catalyst used in the present invention, the amount of the transition metal contained therein is usually 0.05 to 10 g and preferably 0.1 to 2 g per 100 g of the carrier.

If the amount of the transition metal contained in the catalyst is out of the above-specified range, the catalytic activity thereof tends to be deteriorated.

The use of such a supported catalyst enables production of polymers having an industrially useful high bulk density and an excellent particle size distribution.

The buten-1-based polymer used in the present invention may be produced by homopolymerizing buten-1, or copolymerizing buten-1 with a $C_2$ to $C_{20}$ α-olefin except for buten-1, in the presence of the above polymerization catalyst.

In this case, the polymerization method is not particularly limited, and examples of the polymerization methods include slurry polymerization, vapor-phase polymerization, bulk polymerization, solution polymerization and suspension polymerization. Of these methods, preferred is solution polymerization.

As to the polymerization conditions, the polymerization temperature is in the range of usually from −100 to 250° C., preferably from −50 to 200° C. and more preferably from 0 to 130° C.

Also, the amounts of the reactants and the catalyst used may be controlled such that the molar ratio of the raw monomers to the above component (A) is preferably in the range of 1 to $10^8$ and more preferably 100 to $10^5$.

Further, the polymerization time is usually from 5 min to 10 h, and the polymerization reaction pressure is preferably from ordinary pressure to 20 MPa (gauge) and more preferably from ordinary pressure to 10 MPa (gauge).

The molecular weight of the polymer may be controlled by appropriately selecting kinds and amounts of the respective catalyst components and polymerization temperature, and further by conducting the polymerization in the presence of hydrogen.

The polymerization reaction may be conducted in the presence of a solvent. Examples of the solvent include aromatic hydrocarbons such as benzene, toluene, xylene and ethyl benzene; alicyclic hydrocarbons such as cyclopentane, cyclohexane and methyl cyclohexane; aliphatic hydrocarbons such as pentane, hexane, heptane and octane; and halogenated hydrocarbons such as chloroform and dichloromethane.

These solvent may be used alone or in the combination of any two or more thereof.

Also, the monomers such as α-olefins may be used as the solvent.

Meanwhile, the polymerization may also be performed in the absence of a solvent.

Prior to the substantial polymerization, a preliminary polymerization may be conducted using the above polymerization catalyst.

The preliminary polymerization may be conducted, for example, by contacting the solid catalyst component with a small amount of olefins. The contact method is not particularly limited, and may be any known method.

Also, the olefins usable in the preliminary polymerization are not particularly limited, and there may be used the same olefins as exemplified above, e.g., ethylene, $C_2$ to $C_{20}$ α-olefins or mixtures thereof. The olefins used in the preliminary polymerization are preferably identical to those used in the subsequent substantial polymerization.

The preliminary polymerization temperature is in the range of usually from −20 to 200° C., preferably from −10 to 130° C. and more preferably from 0 to 80° C.

The preliminary polymerization may be conducted in the presence of any suitable solvent such as aliphatic hydrocarbons, aromatic hydrocarbons and other monomers.

Of these solvents, preferred are aliphatic hydrocarbons.

Also, the preliminary polymerization may be conducted in the absence of a solvent.

The preliminary polymerization conditions may be suitably controlled such that the obtained preliminary polymerization reaction product has an intrinsic viscosity [η] of 0.2 dL/g or more and preferably 0.5 dL/g or more as measured at 135° C. in decalin, and the yield of the reaction product is 1 to 10000 g and preferably 10 to 1000 g per one millimole of the transition metal contained in the catalyst.

The present invention will be described in more detail by referring to the following examples. However, it should be noted that the following examples are only illustrative and not intended to limit the invention thereto.

PRODUCTION EXAMPLE 1

Production of Buten-1 Homopolymer (1) Production of Complex: Synthesis of (1,2'-dimethylsilylene) (2,1'-dimethylsilylene)-bis(3-trimethylsilylmethylindenyl)zirconium dichloride In a Schlenk's bottle, 3.0 g (6.97 mM) of a lithium salt of (1,2'-dimethylsilylene) (2,1'-dimethylsilylene)-bis(indene) was dissolved in 50 mL of tetrahydrofuran (THF), and the obtained solution was cooled to −78° C.

Then, 2.1 mL (14.2 mM) of iodomethyl trimethylsilane was slowly dropped into the solution, and then the solution was stirred at room temperature for 12 h.

The resultant reaction solution was distilled to remove the solvent therefrom, and then after adding 50 mL of ether thereto, the reaction solution was washed with a saturated ammonium chloride solution.

An organic phase was separated from the solution, and then dried to remove the solvent therefrom, thereby obtaining 3.04 g (5.88 mM) of (1,2'-dimethylsilylene) (2,1'-dimethylsilylene)-bis(3-trimethylsilylmethylindene) (yield: 84%).

Next, a Schlenk's bottle was charged with 3.04 g (5.88 mM) of the thus obtained (1,2'-dimethylsilylene) (2,1'-dimethylsilylene)-bis(3-trimethylsilylmethylindene) and 50 mL of ether under a nitrogen flow.

After the contents of the bottle were cooled to −78° C., 7.6 mL of a hexane solution containing 1.54 M/L of n-BuLi (11.7 mM) was added thereto, and then the resultant mixture was stirred at room temperature for 12 h.

Then, the solvent was distilled away from the reaction mixture, thereby obtaining a solid. The thus obtained solid was washed with 40 mL of hexane to obtain 3.06 g (5.07 mM) of a lithium salt in the form of an ether adduct (yield: 73%).

The results of $^1$H-NMR (90 MHz, THF-$d_8$) measurement of the obtained product were as follows:

δ: 0.04 (s, 18H, trimethylsilyl); 0.48 (s, 12H, dimethylsilylene); 1.10 (t, 6H, methyl); 2.59 (s, 4H, methylene); 3.38 (q, 4H, methylene); 6.2-7.7 (m, 8H, Ar—H)

The thus obtained lithium salt was dissolved in 50 mL of toluene under a nitrogen flow.

After the resultant solution was cooled to −78° C., a suspension prepared by dispersing 1.2 g (5.1 mM) of zirconium tetrachloride in 20 mL of toluene which was previously cooled to −78° C., was dropped into the solution.

After completion of the dropping, the resultant mixture was stirred at room temperature for 6 h.

The resultant reaction solution was distilled to remove the solvent therefrom. The obtained distillation residue was recrystallized with dichloromethane, thereby obtaining 0.9 g (1.33 mM) of (1,2'-dimethylsilylene) (2,1'-dimethylsilylene)-bis(3-trimethylsilylmethylindenyl)zirconium dichloride (yield: 26%).

The results of $^1$H-NMR (90 MHz, CDCl$_3$) measurement of the obtained product were as follows:

δ: 0.0 (s, 18H, trimethylsilyl); 1.02, 1.12 (s, 12H, dimethylsilylene); 2.51 (dd, 4H, methylene); 7.1-7.6 (m, 8H, Ar—H)

(2) Production of Buten-1 Homopolymer

A 10 L autoclave previously heat-dried was charged with 4 L of heptane, 2.5 kg of buten-1, 10 mM of triisobutyl aluminum and 10 mM of methyl aluminoxane, and further hydrogen was introduced into the autoclave until reaching 0.05 MPa.

After heating the contents of the autoclave to 60° C. while stirring, 10 μM of (1,2'-dimethylsilylene) (2,1'-dimethylsilylene)-bis(3-trimethylsilylmethylindenyl)zirconium dichloride as the catalyst prepared in the above step (1) was added thereto, and the polymerization was conducted for 60 min.

After completion of the polymerization reaction, the resultant reaction product was dried under reduced pressure to obtain 990 g of a buten-1 homopolymer.

The resin properties of the thus obtained buten-1 homopolymer were evaluated by the following methods. The results are shown below.

| | |
|---|---|
| Mesopentad fraction [mmmm] (mol %): | 71.6 |
| Racemic triad fraction [rr] (mol %): | 4.6 |
| 90 − 2 × [rr]: | 80.8 |
| Stereoregularity index [mmmm]/([[mmrr] + [mmmr]): | 8 |
| Weight-average molecular weight (Mw): | 51 × 10$^4$ |
| Molecular weight distribution (Mw/Mn): | 2.0 |
| Melting point (Tm-D: DSC measurement)(° C.): | 73 |
| CII (%): | 0 |

Meanwhile, the above resin properties were measured by the following methods.

(1) Measurement of mesopentad fraction, racemic triad fraction and stereoregularity index Measured by the methods described in the present specification.

(2) Measurement of weight-average molecular weight (Mw) and molecular weight distribution (Mw/Mn)

Measured by the method described in the present specification.

(3) DSC measurement (Measurement of melting point: Tm-D)

Measured by the method described in the present specification using a differential scanning calorimeter "DSC-7" available from Perkin Elmer Corp.

(4) Measurement of II-type crystal fraction

Measured by the method described in the present specification.

PRODUCTION EXAMPLE 2

Production of Low-Molecular Buten-1 Homopolymer

The same procedure as in PRODUCTION EXAMPLE 1 was repeated except that hydrogen was introduced until reaching 0.4 MPa in the step (2) of PRODUCTION EXAMPLE 1 upon production of the buten-1 homopolymer.

The resin properties of the thus obtained buten-1 homopolymer were evaluated by the above-described methods. The results are shown below.

| | |
|---|---|
| Mesopentad fraction [mmmm] (mol %): | 72.0 |
| Weight-average molecular weight (Mw): | 65,000 |
| Molecular weight distribution (Mw/Mn): | 1.9 |

EXAMPLE 1

An one-liter egg-shaped flask equipped with a Dimroth condenser was charged with 5.0 g of the buten-1 homopolymer obtained in PRODUCTION EXAMPLE 1 and 200 mL of p-xylene, and the contents of the flask were stirred at 80° C. for 30 min.

Thereafter, 0.01 g of α,α'-bis(t-butylperoxy)diisopropyl benzene "PERBUTYL P" as an organic peroxide available from Nihon Yushi Co., Ltd., and 0.1 g of maleic anhydride were charged into the flask, and the contents of the flask were stirred under heating at 140° C. for 60 min.

After completion of the heating, the resultant reaction solution was allowed to stand until being cooled to room temperature. Then, after charging 2 L of methanol into the reaction solution, the obtained precipitate was filtered out and then dried, thereby obtaining a modified buten-1 homopolymer.

Next, the thus obtained modified buten-1 homopolymer was subjected to wet tension test (measurement of surface tension), adhesion test and measurement of acid-modified amount by the following methods. The results are shown in Table 1.

<Wet Tension Test>

The plastic film was tested to evaluate a wet tension thereof as a scale of a capability for holding ink, coating or adhesive on a surface thereof.

It is known by experience that when the wet tension increases, the capability for holding ink, coating or adhesive on the surface of the plastic film is also enhanced.

The evaluation of the wet tension of the plastic film was performed according to "Plastic Film and Sheet-Wet Tension Testing Method" prescribed in JIS K6768.

Specifically, the above-obtained modified buten-1 polymer was interposed between Teflon sheets, and pressed through a spacer at 230° C. to prepare a film for evaluation.

The thus prepared film was allowed to stand at room temperature for 8 h or longer.

The plastic film was coated with a mixed solution for wet tension test available from Wako Junyaku Kogyo Co., Ltd., using a cotton swab impregnated with the mixed solution. When a liquid film of the mixed solution formed on the plastic film still remained unbroken, i.e., was kept in an original state even after the elapse of 2 seconds, the condition was evaluated as being "wet".

The testing mixed solutions were subjected to the wet tension test sequentially from the solution having the smallest surface tension, and the largest surface tension of the solution among those evaluated as being "wet" was determined as the wet tension of the plastic film.

<Evaluation of Adhesion Test>

The evaluation of the adhesion test was performed according to "Peeling Adhesion Strength Testing Method" (JIS K6854).

The above-produced modified buten-1 polymer was placed in a glass sampling tube, and heated and melted in an oil bath at 200° C.

The molten polymer was uniformly applied onto a portion of a strip-like aluminum plate having a size of 30 mm in width, 150 mm in length and 0.5 mm in thickness which portion extended from its lower end up to 100 mm, using a glass rod.

An aluminum plate of the same type was overlapped on the thus coated aluminum plate, and immediately press-bonded together using a hot press at 200° C. under a pressure of 5 MPa for 3 min.

The thus prepared test specimen was allowed to stand at room temperature for 8 h or longer, and then subjected to T-peel test.

The peel test was performed using "Autograph DSC-2000" available from Shimadzu Seisakusho Co., Ltd., to measure a maximum load at a pull speed of 100 mm/min as an adhesion strength.

Further, the peeled surface of the aluminum plate after the test was observed and evaluated according to the following ratings.

A: Unpeelable;

B: 80% or more of the bonded surface was peeled off owing to material fracture;

C: Less than 80% of the bonded surface was peeled off owing to material fracture; and D: Bonded surface was peeled off from a boundary face thereof (coated sample still remained on the whole coating surface without material fracture).

<Measurement of Acid-Modified Amount>

The acid-modified amount was determined as follows. A blended mixture of the unmodified buten-1-based polymer and the organic acid was pressed through a 0.1 mm-thick spacer, and subjected to IR measurement to prepare a calibration curve from the measured IR absorption of carbonyl peculiar to the polymer (1600-1900 cm$^{-1}$) and the amount of the organic acid charged. Whereas, a pressed plate of the acid-modified polymer was subjected to the same IR measurement to determine a modification rate thereof.

IR Measuring Device: "FT/IR-5300" available from Nihon Bunko Co., Ltd.

EXAMPLE 2

Five hundred grams of the buten-1 homopolymer obtained in PRODUCTION EXAMPLE 1 which was cut into pieces with a size of 5 mm or smaller by scissors, was intimately mixed with 1.5 g of maleic anhydride and 0.1 g of 2,5-dimethyl-2,5-di(t-butylperoxy)hexyn-3 as an organic peroxide "Perhexyne 25B" available from Nihon Yushi Co., Ltd., and the resultant mixture was extruded at a resin temperature of 180° C. using a labo plastomill twin-screw extruder "2D25W Model" available from Toyo Seiki Seisakusho Co., Ltd., thereby obtaining pellets of a modified buten-1 homopolymer.

Next, the thus obtained pellets were subjected to the wettability test, adhesion test and measurement of acid-modified amount by the same methods as described in EXAMPLE 1. The results are shown in Table 1.

EXAMPLE 3

The same procedure as in EXAMPLE 2 was repeated except that the amounts of maleic anhydride and "Perhexyne 25B" used were changed to 5 g and 0.2 g, respectively, and 5 g of styrene was further added to the reaction system, thereby obtaining pellets of a modified buten-1 homopolymer. The thus obtained pellets were subjected to the wettability test, adhesion test and measurement of acid-modified amount by the same methods as described above. The results are shown in Table 1.

EXAMPLE 4

An one-liter separable three-necked flask equipped with agitation blades was charged with 150 g of the buten-1 homopolymer obtained in PRODUCTION EXAMPLE 2. After heating the homopolymer to 160° C., 0.94 mL of di-t-butyl peroxide and 2.0 g of maleic anhydride were added thereto.

After stirring the contents of the flask for about 30 min, the contents were charged into a stainless steel vat, and then allowed to stand for cooling, thereby obtaining a modified buten-1 homopolymer.

Next, the thus obtained modified buten-1 homopolymer was press-molded. The resultant molded article was subjected to the wettability test (measurement of surface tension), adhesion test and measurement of acid-modified amount by the same methods as described above. The results are shown in Table 1.

EXAMPLE 5

The same procedure as in EXAMPLE 4 was repeated except that 2.0 g of maleic anhydride was changed to 15.0 g of acrylic acid, thereby obtaining a modified buten-1 homopolymer.

Next, the thus obtained modified buten-1 homopolymer was press-molded. The resultant molded article was subjected to the wettability test (measurement of surface tension), adhesion test and measurement of acid-modified amount by the same methods as described above. The results are shown in Table 1.

EXAMPLE 6

The same procedure as in EXAMPLE 4 was repeated except that the amount of di-t-butyl peroxide used was changed to 1.88 mL, and 45 g of acrylic acid was added to the reaction system for 45 min, thereby obtaining a modified buten-1 homopolymer.

Next, the thus obtained modified buten-1 homopolymer was press-molded. The resultant molded article was subjected to the wettability test (measurement of surface tension), adhesion test and measurement of acid-modified amount by the same methods as described above. The results are shown in Table 1.

COMPARATIVE EXAMPLE 1

The same procedure as in EXAMPLE 1 was repeated except that the buten-1 homopolymer obtained in PRODUCTION EXAMPLE 1 was directly press-molded. The resultant molded article was subjected to the wettability test and adhesion test by the same methods as described above. The results are shown in Table 1.

TABLE 1

|  | Examples | | | | | | Com. Ex. |
| --- | --- | --- | --- | --- | --- | --- | --- |
|  | 1 | 2 | 3 | 4 | 5 | 6 | 1 |
| Surface tension (mN/m) | 33 | 32 | 33 | 33 | 33 | 34 | >30 |
| Acid-modification rate (wt%) | 0.25 | 0.20 | 0.27 | 0.43 | 2.6 | 7.3 | 0 |
| Evaluation of adhesion test: observation of peeled condition | — | — | — | B | B | B | D |
| Evaluation of adhesion test: adhesion strength (kN/m) | — | — | — | 3.4 | 0.88 | 0.83 | * |

Note:
* Easily peeled off and, therefore, unmeasurable.

When the surface tension was as low as used in COMPARATIVE EXAMPLE 1, the molded article failed to exhibit a good coatability, and it was therefore required to subject it to surface treatments such as primer treatment and corona treatment.

On the other hand, when the surface tension was as high as those used in EXAMPLES, the molded articles exhibited a good coatability and printability without the above post treatments.

As to the maleic acid-modifying amount, since the polymer of COMPARATIVE EXAMPLE 1 was not acid-modified, it was required to subject the molded article prepared therefrom to the above post treatments.

Further, the polymer of COMPARATIVE EXAMPLE was also insufficient in dispersibility of additives such as fillers therein.

On the other hand, in EXAMPLES, since the acid-modifying amount was within the suitable range, the obtained molded articles were improved in coatability, printability and dispersibility of additives therein while maintaining properties of the buten-1 homopolymer modified.

Also, from the results of the adhesion test, it was confirmed that the modified buten-1 homopolymer was enhanced in adhesion strength.

INDUSTRIAL APPLICABILITY

According to the present invention, when the buten-1-based polymer composed of a buten-1 homopolymer or a copolymer of buten-1 with a $C_2$ to $C_{20}$ α-olefin except for buten-1 which has specific properties, is subjected to modification treatment, the obtained modified buten-1-based polymer can impart a high adhesiveness, a high strength and a good softness to polyolefins, etc., is useful as sealants having a high adhesiveness or modifiers for producing polyolefins having an improved compatibility with inorganic fillers, etc. According to the present invention, there is also provided an adhesive composition containing the modified buten-1-based polymer. In particular, the adhesive composition of the present invention is useful as an adhesive for metals, papers, etc.

What is claimed is:

1. A process for producing a modified buten-1-based polymer comprising the step of modifying a buten-1-based polymer satisfying the following requirements (a), (b), (c) and (d):
(a) a crystalline resin having a melting point (Tm-D) of 0 to 100° C., the melting point being defined as a top of a peak observed on a highest-temperature side in a melting endothermic curve obtained by a differential scanning calorimeter (DSC) when a sample is held in a nitrogen atmosphere at −10° C. for 5 min and then heated at a temperature rise rate of 10° C./min;

(b) a stereoregularity index represented by [mmmm]/([mmrr]+[rmmr]) of 20 or less;

(c) following formulae

20%<[mmmm]≦90%, and [mmmm]≦(90−2×[rr]) %; and (d) a weight-average molecular weight (Mw) of 10,000 to 1,000,000 and a ratio (Mw/Mn) of weight-average molecular weight to number-average molecular weight of 4.0 or less, with a radical polymerization initiator and an organic acid.

2. The process according to claim 1, wherein said buten-1-based polymer is a buten-1 homopolymer or a copolymer of buten-1 containing buten-1 units in an amount of 90 mol % or more, with a $C_2$ to $C_{20}$ α-olefin except for buten-1.

3. The process according to claim 1, wherein said buten-1-based polymer has a II-type crystal fraction (CII) of 50% or less, as measured by X-ray diffraction analysis after the polymer to be analyzed is melted at 190° C. for 5 mm, rapidly cooled and solidified with ice water, and then allowed to stand at room temperature for 1 h.

4. The process according to claim 1, wherein the modification of said buten-1-based polymer is performed in an organic solvent.

5. The process according to claim 1, wherein the modification of said buten-1-based polymer is performed in a molten state.

6. The process according to claim 1, wherein the radical polymerization initiator is an organic peroxide, and the organic acid is a compound selected from the group consisting of maleic anhydride, acrylic acid and acrylic acid esters.

7. The process according to claim 1, wherein the modification of said buten-1-based polymer is performed under the coexistence of a styrene-based compound.

8. The process according to claim 1, wherein the buten-1-based polymer prior to the modification has been obtained in the presence of a metallocene catalyst.

9. A modified buten-1-based polymer produced by the process as claimed in claim 1.

10. The modified buten-1-based polymer according to claim 9, wherein said polymer has a weight-average molecular weight (Mw) of 10,000 to 600,000.

11. A modified buten-1-based polymer produced by the process as claimed in claim 8.

12. An adhesive composition comprising the modified buten-1-based polymer as claimed in claim 9, and one or more additives.

13. The adhesive composition according to claim 12, wherein 100 parts by mass of the buten-1-based polymer is modified with 0.1 to 50 parts by mass of the organic acid selected from the group consisting of maleic anhydride, acrylic acid and acrylic acid esters.

14. An adhesive composition comprising the modified buten-1-based polymer as claimed in claim 11, and one or more additives.

* * * * *